United States Patent
Sydell et al.

(10) Patent No.: US 9,152,646 B2
(45) Date of Patent: Oct. 6, 2015

(54) ORDERING CONTENT ITEMS

(71) Applicant: Dropbox, Inc., San Francisco, CA (US)

(72) Inventors: Alex Sydell, San Francisco, CA (US); Kyle Consalus, San Francisco, CA (US)

(73) Assignee: Dropbox, Inc., San Francisco, CA (US)

(*) Notice: Subject to any disclaimer, the term of this patent is extended or adjusted under 35 U.S.C. 154(b) by 169 days.

(21) Appl. No.: 13/857,415

(22) Filed: Apr. 5, 2013

(65) Prior Publication Data

US 2014/0304312 A1    Oct. 9, 2014

(51) Int. Cl.
*G06F 17/30* (2006.01)

(52) U.S. Cl.
CPC .............................. *G06F 17/30203* (2013.01)

(58) Field of Classification Search
None
See application file for complete search history.

(56) References Cited

U.S. PATENT DOCUMENTS

| | | | | |
|---|---|---|---|---|
| 7,884,056 | B2* | 2/2011 | Bendejacq et al. | 507/219 |
| 2006/0206790 | A1* | 9/2006 | Komamura et al. | 715/500 |
| 2007/0014543 | A1* | 1/2007 | Nakase et al. | 386/107 |
| 2007/0036444 | A1* | 2/2007 | Yoshida | 382/232 |
| 2008/0012954 | A1* | 1/2008 | Sasaki et al. | 348/222.1 |
| 2008/0077597 | A1* | 3/2008 | Butler | 707/10 |
| 2008/0091749 | A1* | 4/2008 | Kitamaru | 707/205 |
| 2009/0070669 | A1* | 3/2009 | Hirota | 715/700 |
| 2009/0087104 | A1* | 4/2009 | Nakate | 382/224 |
| 2009/0185052 | A1* | 7/2009 | Tokunaga | 348/231.3 |
| 2010/0083117 | A1* | 4/2010 | Matsumoto | 715/731 |
| 2010/0198849 | A1* | 8/2010 | Thomas et al. | 707/758 |
| 2010/0226594 | A1* | 9/2010 | Mikawa | 382/309 |
| 2011/0150362 | A1* | 6/2011 | Mitra et al. | 382/286 |
| 2014/0129910 | A1* | 5/2014 | Kota et al. | 715/202 |
| 2014/0181030 | A1* | 6/2014 | Wansbrough et al. | 707/639 |
| 2014/0181438 | A1* | 6/2014 | Varadharajan et al. | 711/162 |
| 2014/0189545 | A1* | 7/2014 | Kenna et al. | 715/760 |
| 2014/0279973 | A1* | 9/2014 | Kelley et al. | 707/695 |

* cited by examiner

*Primary Examiner* — Hung Le
(74) *Attorney, Agent, or Firm* — Novak Druce Connolly Bove + Quigg LLP (57) ABSTRACT

A creation order of content items can generally be determined by a metadata creation time associated with the content items. In some instances, multiple content items can be associated with the same metadata creation time. To determine the order of content items associated with the same metadata creation time, a files system modification time for the content items can be accessed. The file system modification time may indicate time in a smaller time increment than the metadata creation time. If the creation order of the content items cannot be determined from the file system modification time, the names of the content items can be analyzed to determine if they indicate a creation order. Alternatively the order the content items are placed in memory can be used to determine the creation order. Metadata identifying the determined creation order of the content items can be appended to the content items.

20 Claims, 8 Drawing Sheets

Content Item B
Created: 3/13/13
2:07:00:35

Content Item C
Created: 3/13/13
2:07:00:33

FIG. 5

ORDERING CONTENT ITEMS

TECHNICAL FIELD

The present technology pertains to content items, and more specifically pertains to determining a creation order of the content items.

BACKGROUND

Cloud storage accounts allow users to store their content items in an online storage account that can be accessed from any computing device with a network connection. Users can thus upload content items such as pictures, songs, documents, etc. from a computing device to their online storage account and later access the content items from different computing devices.

Cloud storage accounts can be especially useful for storing and viewing photographs taken from multiple computing devices. In addition to traditional cameras, a wide variety of computing devices now include capabilities to capture photographs. For example, a user can take pictures using a smart phone, MP3 music player, laptop computer, etc. Storing photographs from the multiple computing devices to an online storage account can thus allow a user to easily organize and manage their photographs.

One important aspect of presenting photographs is to present them in their proper grouping and order. Photographs often tell a story and thus intermixing photographs taken from multiple devices and/or presenting them in the wrong order can ruin the story or make it hard to follow. Presenting photographs in the correct grouping and order can be difficult when receiving photographs from a plurality of computing device. Distinguishing the proper order of photographs becomes even more difficult when the photographs are taken within a small time frame. Accordingly, an improved method of presenting photographs is needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for determining a creation order for content items. The creation order of content items can generally be determined from a metadata creation time associated with each of the content items. The metadata creation time can indicate the time the content item was created or modified. In some instances, multiple content items can be associated with the same metadata creation time if they were created within the minimum time increment in which the metadata creation time is recorded. For example, if the metadata creation time is recorded in seconds, two content items created in the same second would have the same metadata creation time.

To determine the creation order of content items associated with the same metadata creation time, the file system modification time of the content items can be accessed. The file system modification time can indicate the time when the file system recorded that the content items were created or modified. In some instances, the file system modification time can be recorded in a finer time increment than the metadata creation time. For example, the file system modification time can be recorded in milliseconds.

If the file system modification time is not recorded in a finer time increment than the metadata creation time, the creation order of the content items with the same metadata creation time can be determined from the file name associated with the content items. For example, the file name may include a number that represents the order in which the content item was created.

Alternatively the creation order of the content items can be determined based on the order in which the content items are placed in memory. For example, the content items can be stored in an indexed list in which newly created or modified content items are added to the end of the indexed list.

In some embodiments, the creation order of the content items can be determined based on an analysis of the content of the content items. For example, the content of photographs can be analyzed to identify motion of the images captured by the photographs. The creation order of the content items can be determined based on the identified motion.

Upon determining the creation order of the content items associated with the same metadata creation time, metadata identifying the determined creation order can be added to the content items. For example, the metadata can indicate that a content item was created second out of three content items associated with the same metadata creation time.

BRIEF DESCRIPTION OF THE DRAWINGS

The above-recited and other advantages and features of the disclosure will become apparent by reference to specific embodiments thereof which are shown in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for determining a creation order of content items. The creation order of content items can generally be determined by a metadata creation time associated with the content items. The metadata creation time can be a time recorded when the content item was created or modified and attached to the content item as metadata.

In some instances, multiple content items can be associated with the same metadata creation time. To determine the order of content items associated with the same metadata creation time, a files system modification time for the content items can be accessed. The file system modification time may be recorded in a smaller time increment than the metadata creation time. For example, the file system modification time may be recorded in milliseconds, whereas the metadata creation time may be recorded in only seconds.

If the creation order of the content items cannot be determined from the file system modification time, the names of the content items can be analyzed to determine if they indicate a creation order. Alternatively the order the content items are placed in memory can be used to determine the creation order. Metadata identifying the determined creation order of the content items can be appended to the content items.

Figure 1:
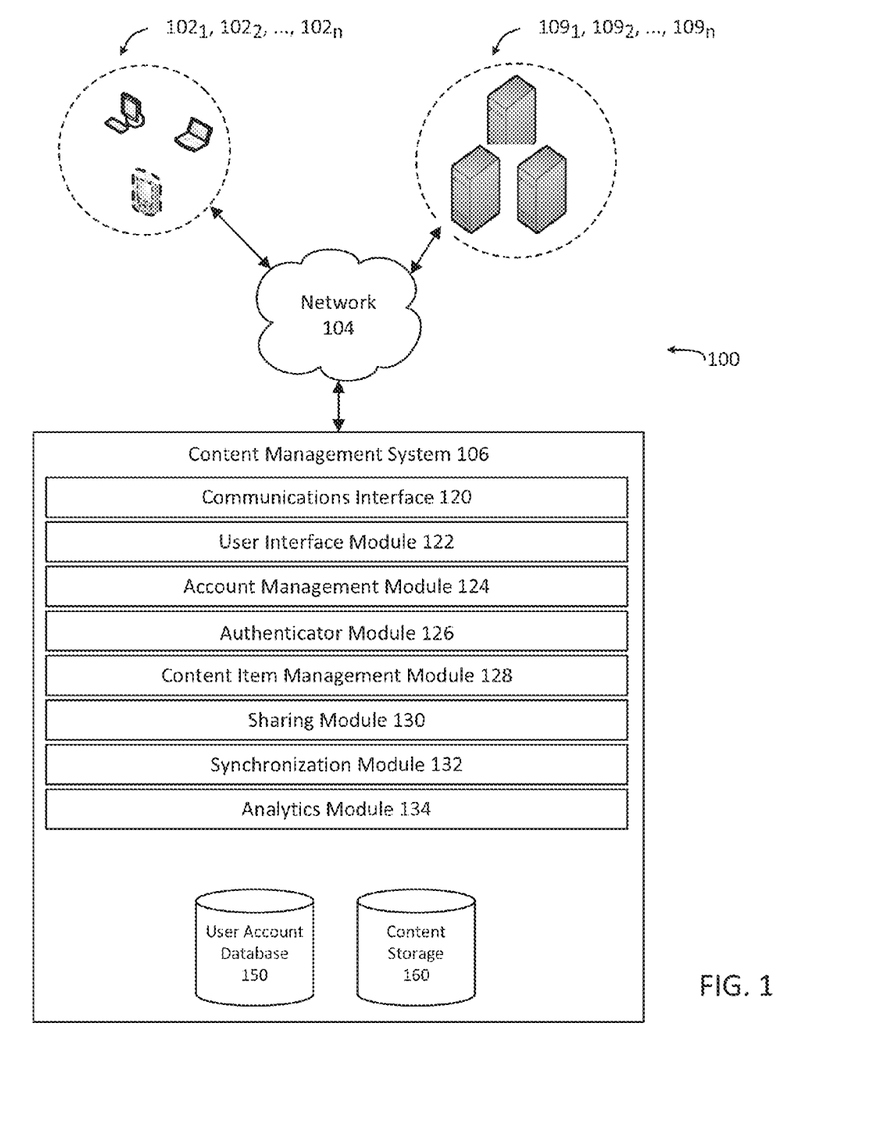
FIG. 1 shows an exemplary configuration of devices and a network in accordance with the invention.

An exemplary system configuration 100 is shown in FIG. 1, wherein electronic devices communicate via a network for purposes of exchanging content and other data. The system can be configured for use on a wide area network such as that shown in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1, 102_2, \ldots, 102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1$, $109_2$, ..., $109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 and user devices 102 are presented with specific components, it should be understood by one skilled in the art, that the architectural configuration of content management system 106 and user devices 102 are simply one possible configuration and that other configurations with more or less components are also possible. For example, in some embodiments, client devices 102 and content management system 106 can be configured to determine a creation order for content item.

Figure 2:
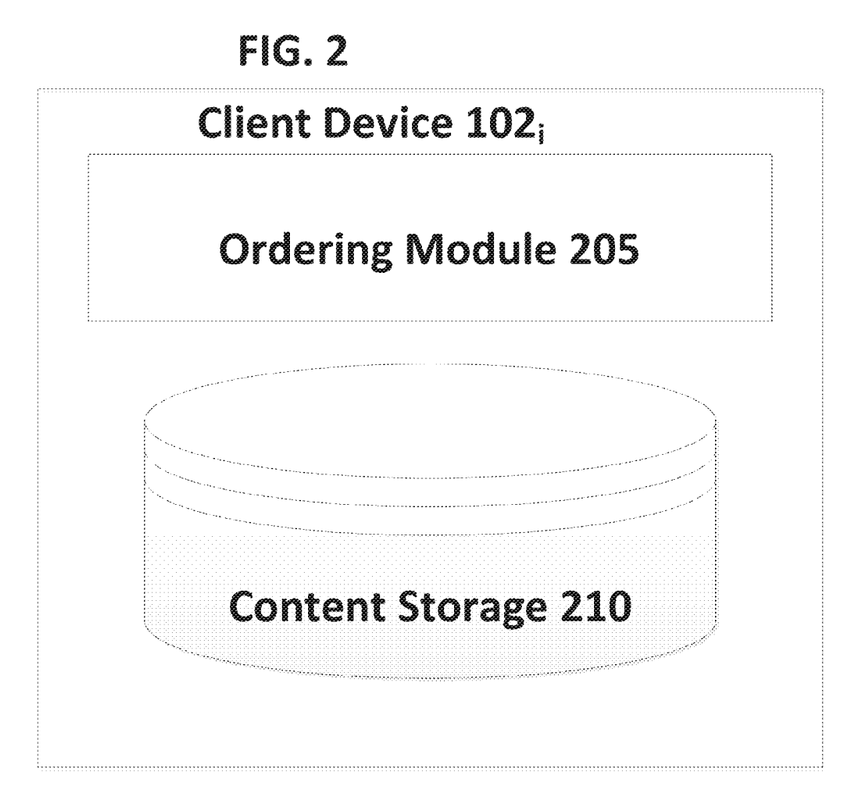
FIG. 2 shows an exemplary embodiment of a client device configured to determine a creation order for content items.

FIG. 2, which is described in view of FIG. 1, shows one exemplary embodiment of client device $102_i$ that includes ordering module 205 configured to determine a creation order for content items. The creation order of content items can be used to present the content items in the order in which they were created. This can be especially useful when presenting content items such as photographs.

In some embodiments, ordering module 205 can determine the creation order of content items stored on client device $102_i$ prior to uploading the content items to content management system 106. Alternatively, in some embodiments, ordering module 205 can be configured to determine the creation order of content items periodically or as the content items are created, stored or modified on client device $102_i$.

In some embodiments, ordering module 205 can be configured to determine the creation order of content items as they are created. For example, ordering module 205 can be configured to receive a signal or message indicating that a new content item has been created. Ordering module 205 can then set a timer for a predetermined amount of time to determine if further content items are created. If a new content item is created, in some embodiments, ordering module 205 can reset the time for the predetermined time. After the timer has expired without a new content item being created, ordering module 205 can determine the creation order of the newly created content items.

As an alternative to resetting the timer each time a new content item is created, in some embodiments, ordering module 205 can be configured to only reset the timer a predetermined number of times. For example, ordering module 205 can be configured to reset the time up to 10 times when a new content item is created, but after the $10^{th}$ time, the timer will no longer be reset and ordering module 205 will determine the creation order when the time expires. Alternatively, ordering module 205 can be configured to determine the creation order of content items no later than a maximum amount of time has elapsed from receiving an input that a new content item was created. For example, ordering module 205 can reset each time a new content item is created, but after 60 seconds from receiving the first input that a content item was created, ordering module will begin determining an order of the created content items even if the timer has not expired.

In most instances, the creation order of content items can be determined based on metadata associated with each content item that indicates the time the content was created or last modified. For example, a content item such as an image file created in the exchangeable image file format (EXIF) can include a metadata tag that identifies the date and time the image file was created or modified. A metadata creation time, such as the EXIF creation time, gathered from a group of content items can be compared to each other to easily determine the creation order of the content items.

Although the creation order of content items can often be determined using the metadata creation time associated with the content items, this may not always be the case. In some instances content items created in rapid succession might be associated with the same metadata creation time. For example, a metadata creation time, such as an EXIF creation time, may measure time in seconds. Thus, if multiple content items are created or modified within the same second, the metadata creation time associated with each of the content items created or modified within the same second would indicate that the content items were created at the exact same time.

This is often the case when multiple photographs are taken in rapid succession. Furthermore, the order of photos taken in rapid succession can be extremely important because photographs taken in rapid succession often portray movement of an object. Thus, if the photographs are not presented in the sequence in which they were taken, the captured movement is portrayed incorrectly.

To resolve the order of multiple content items associated with the same metadata creation time, ordering module 205 can be configured to communicate with the file system of client device $102_i$ to gather a file system modification time recorded by the file system for the content items. The file system modification time can indicate the time a content item was created or modified on the file system. In some instances, the file system creation time can measure time in smaller increments than the metadata creation time. For example, the file system creation time may measure time in milliseconds whereas the metadata creation time may measure time in seconds. Thus, in many instances, the order of content items with the same metadata creation time can be determined by the file system modification time that measures time in a smaller increment.

Although the file system modification time can be used to determine the creation order of content items with the same metadata creation time, the metadata creation time can be given priority in determining the creation order of content item. For example, in some instances, the file system modification time may be inconsistent with the metadata creation time because the file system clock may not be in perfect sync with the clock used to create the metadata creation time. This can result in the file system clock being slightly ahead or behind the clock used to create the metadata creation time. Due to this possible inconsistency, the file system modification time can be used only to resolve the creation order of content items with the same metadata creation time. That is, the file system modification time of two content items associated with the same metadata creation time can be used only to determine the creation order of the two content items, rather than determine their actual creation time with respect to other content items.

Figure 3A:
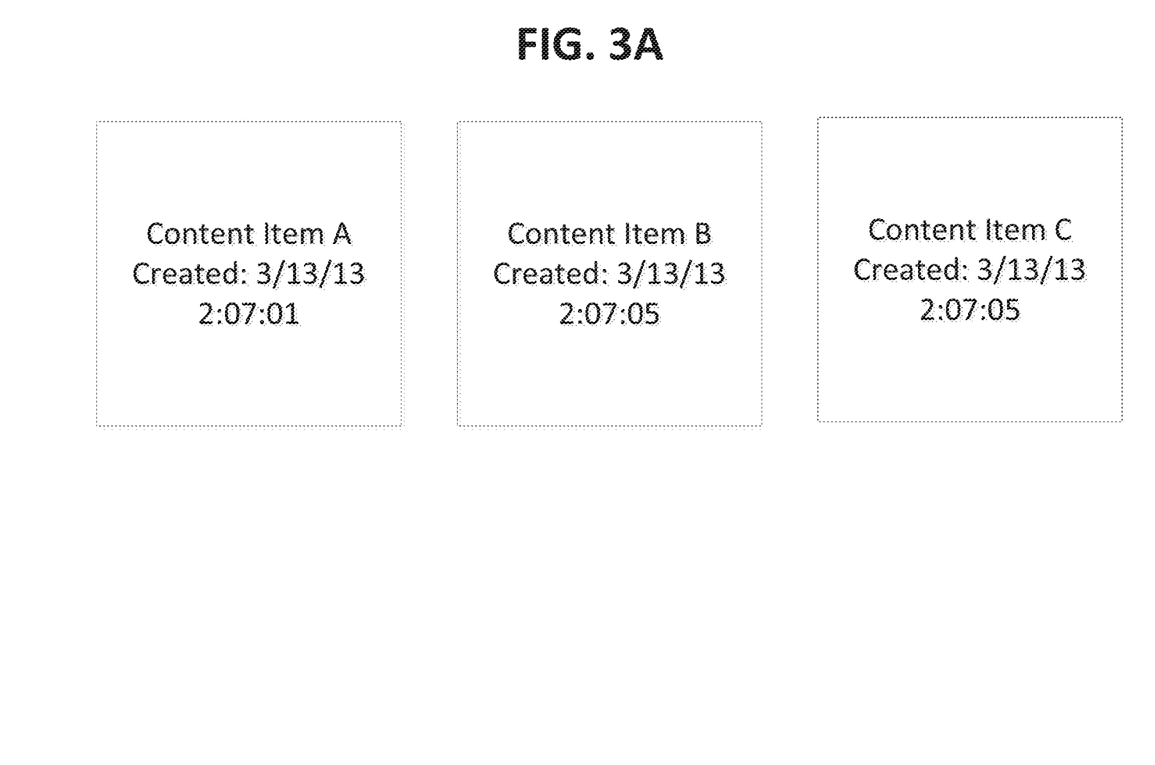
FIGS. 3A and 3B show an example of determining the creation order of content items using the file system modification time
Figure 3B:
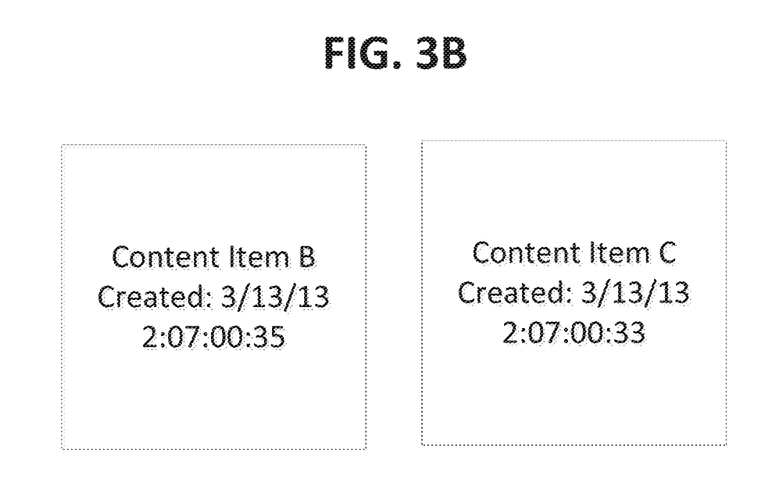

FIGS. 3A and 3B show an example of determining the creation order of content items using the file system modification time. FIG. 3A shows three content items and their corresponding metadata creation time. As shown, all three content items; content item A, content item B and content item C, were created on 3/13/13 at varying times. To determine the creation order, the metadata creation time of the content items can be further analyzed to identify the exact creation time. According to the metadata creation time, content item A was created at 2:07:01, and content items B and C were each created at 2:07:05. Thus a determination can be made that content item A was created prior to both content items B and C.

The creation order of content item B and content item C cannot be determined from the metadata creation time because both content item B and content item C have the same metadata creation time. This can be the result of both content item B and content item C having been created during the same second. Accordingly, the file system modification time of content item B and content item C can be accessed to determine the creation order for content item B and content item C.

FIG. 3B shows content item B and content item C along with their corresponding file system modification time. As shown, the file system modification time measures time in milliseconds, whereas the metadata creation time shown in FIG. 3A measures time in only seconds. As shown content item B was created at 2:07:00:35 and content item C was created at 2:07:00:33. Thus a conclusion can be made that content item C was created prior to content item B.

Further, the fact that the file system modification time of content item B and content item C indicate that they were created prior to the metadata creation time of content item A, does not affect the creation order of content items A, B and C. The file system modification time can be used to resolve only the creation order of multiple content items that, according to the metadata creation time, were created at the same time, e.g. within the same second. Accordingly, a determination can be made that content item A was created first based on the metadata creation time. Further a determination can be made that content item C was created second and content item B was created third based on the file system modification time.

Returning to the discussion of FIG. 2, in some instances, the creation order of content items with the same metadata creation time cannot be determined based on the file system modification time. For example, in some embodiments, the file system may record time using the same time increment as the metadata creation time. For example, both the file system and the EXIF time can be measured in seconds, rather than the file system time being measured in milliseconds. In this type of scenario, ordering module 205 can be configured to determine the order of the content items by analyzing the file name associated with each content item. For example, content items such as photos taken by a camera may be assigned a name that indicates the order in which the photos were taken. Ordering module 205 can be configured to analyze the file name associated with the content items to determine if the creation order of the content items can be determined.

As an example, the file name assigned to a content item can include a number that is incremented per each content item created. Thus, the file name assigned to two sequentially created content items can be "file1", and "file2". Ordering module 205 can be configured to extract the numeric portion of the file name of each content item to determine the order in which the content items were created. For example, ordering module 205 can determine that the content item with the lower number in the file name was created prior to the content item with the higher number in the file name.

In some embodiments, the creation order of content items with the same metadata creation time can be determined based on the order of the content item in memory. For example, client device $102_i$ can include content storage 210 configured to store content items in an indexed list such that new content items are added to the end of the indexed list. Ordering module 205 can thus determine the order of content items based on the position of the content item in the indexed list.

In some embodiments, the creation order of content items can be determined based on an analysis of the content of the content items. For example, the content of photographs can be analyzed to identify the movement of objects in the photographs. The order of the content items can then be determined based on the identified movement of the objects.

To accomplish this, ordering module 205 can be configured to compare multiple content items with the same metadata creation time and identify differences in the content items that indicate motion of an object. For example, an analysis of photographs can indicate that a portion of the photograph changes from photograph to photograph, while the rest of the photograph remains closely the same. Alternatively, the analysis can indicate that a similar shaped and sized object changes positions across the multiple photographs. As another example, the analysis can indicate that a similarly colored object changes position across the photographs. This can indicate that the photographs depict the motion of an object across a background.

Once motion of an object is detected, ordering module 205 can determine the creation order of the content items based on the determined path of the object. For example, if the analysis of the content items indicates that the photographs depicts an object is moving from left to right, ordering module 205 can identify the location of the object in each photograph and order the photographs to correctly depict the motion of the content item from left to right. Thus, the location of the object and the determined motion of the object can be used to correctly order the photographs, and thus determine the creation order.

In some embodiments, content items known to have been created just prior to and just after content items with the same metadata creation time, can be analyzed to determine the creation order of the content items based on the content of the content items. For example, if only two photographs are associated with the same metadata creation time, the direction of the motion of an object in the photographs may be difficult to determine. For example, it may be difficult to determine if the object is travelling from right to left or left to right. Ordering module 205 can thus analyze content items created just prior or just after to determine the direction of the motion of the object. For example, if a photograph known to have been created just after the photographs associated with the same metadata creation time depicts the identified object at a position farther to the left than the object is depicted in the other photographs, a determination can be made that the object is moving to the left. Alternatively, if a photograph known to have been created just prior to the photographs associated with the same metadata creation time depicts the identified object at a position farther to the right than the object is depicted in the other photographs, a determination can be made that the object is moving to the left.

Figure 4:
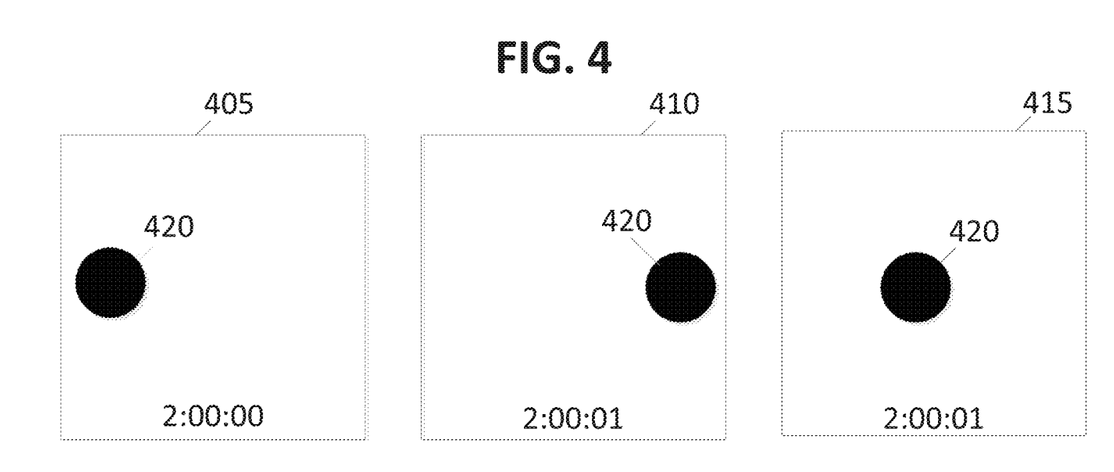
FIG. 4 shows determining the creation order of content items based on an analysis of the content items.

FIG. 4 shows determining the creation order of content items based on an analysis of the content items. As shown three photographs 405, 410 and 415 each depicting black circle 420. The metadata creation time of the three photographs 405, 410 and 415 indicates that photograph 405 was created at 2:00:00 and that content items 410 and 415 were created at 2:00:01. Thus, it can be determined that content item 405 was created prior to content items 410 and 415.

An analysis of content items 410 and 415 indicates that black circle 420 is at a different position in each content item 410 and 415. As shown, black circle 420 is positioned near the right edge in content item 410 and near the middle in content item 415. Based on the analysis of the content of content items 410 and 415 it can be determined that content items 410 and 415 depict motion of black circle 420, however the direction of the motion cannot be positively determined. For example, black circle 420 can be travelling from right to left or from left to right.

To determine the direction of motion of black circle 420, the content of content item 405 can be analyzed. As shown, black circle 420 is positioned near the left edge in content item 405. It can be determined that content items 405, 410 and 415 depict black circle 420 traveling from left to right because content item 405 is known to have been created prior to content items 410 and 415.

Based on the determination that black circle 420 is travelling from left to right, it can be determined that content item 415 was created prior to content item 410 because content item 415 depicts black circle 420 at a position to the left of where black circle 420 is depicted in content item 410. Accordingly, it can be determined that content item 405 was created first, followed by content item 415 and then content item 410. This creation order correctly depicts motion of black circle 420 moving from left to right.

Upon determining the order of the content items associated with the same metadata creation time, ordering module 205 can be configured to add metadata to the content items indicating their determined order. For example, to indicate the determined order of two content items associated with the same metadata creation time, ordering module 205 can add metadata to the content item created first indicating that the content item is one of two content items with the metadata creation time. Likewise, ordering module 205 can add metadata to the content item determined to be created second indicating that the content item is two of two content items with the metadata creation time.

In some embodiments, ordering module 205 can be configured to group content items based on the creation source of the content item. A user may create content items with multiple client devices. Ordering module 205 can be configured to group the content items based on the client device that created the content item when determining the creation order. Thus, content items created by different sources can be ordered separately.

To determine the creation order of content items, in some embodiments, ordering module 205 can be configured to process all the content items to create content item groups based on creation source and metadata creation time of the content items. Each resulting content item group can include content items with the same creation source and the same metadata creation time.

Ordering module 205 can then identify any content item group including multiple content items, which indicates that the content items in the group were created by the same source and have the same metadata creation time. Ordering module 205 can then determine the creation order of the content items in the content item group and add metadata to the content items indicating their determined order.

In some embodiments, ordering module 205 can be configured to first scan all the content items to create the content item groups and, after the content item groups have been created, determine the order of any content items in the same content item group, i.e. with the same creation source and metadata creation time.

Alternatively, in some embodiments, ordering module 205 can be configured to determine the order of the content items as the content item groups are created. For example, client device $102_i$ can be configured to store the content items in an indexed list such that new content items are added to the end of the list. Ordering module 205 can be configured to traverse the indexed list in reverse order to create a content item group and determine the creation order for the content items in a content item group that includes more than one content item.

Figure 5:
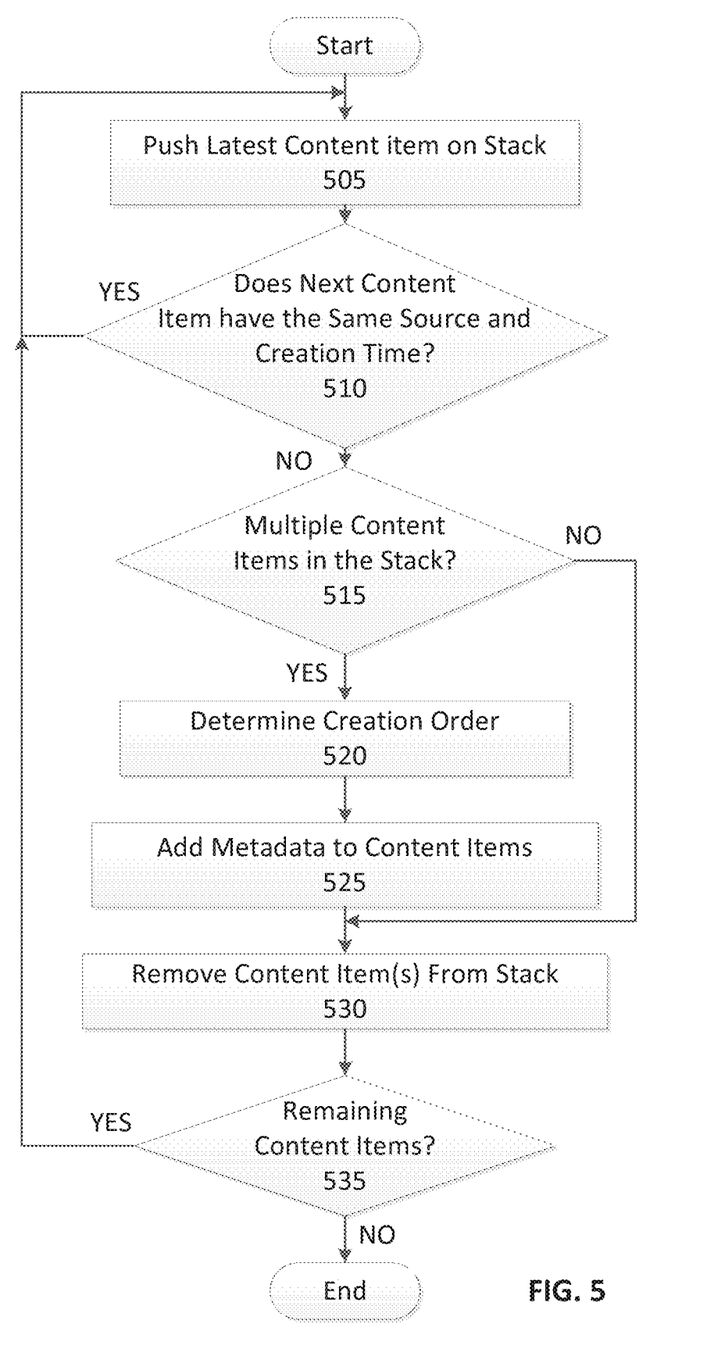
FIG. 5 shows one exemplary method embodiment of traversing an indexed list to determine the creation order of content items.

FIG. 5 shows one exemplary method embodiment of traversing an indexed list to determine the creation order of content items. Although specific steps are show in FIG. 5, in other embodiments a method can have more or less steps.

As shown, the method begins at block 505 where the latest content item in the indexed list is added to a stack. In some embodiments, the indexed list can be traversed in reverse order. Although a stack is used as an example, any similar data structure can be used. For example, in some embodiments, the content item can be added to a queue rather than a stack.

At block 510 the method determines if the next content item in the indexed list has the same creation source and metadata creation time as the content item pushed to the stack. If it is determined that the next content item does have the same creation source and metadata creation time as the content item pushed on the stack, the method returns to block 505 where the content item is pushed on the stack. The method then returns to block 510. Thus, as the indexed list is traversed in reverse order, content items with the same creation source and metadata creation time will be pushed onto the stack together.

If at block 510, it is determined that the next content item does not have the same creation source and metadata creation time as a content item in the stack, the method continues to block 515 where the method determines if there are multiple content items on the stack. If there are multiple content items in the stack, the method continues to block 520 where the creation order of the content item is determined. In some embodiments, the creation order of the content items in the stack can be determined using the method shown in FIG. 6 (below).

Upon determining the creation order of the content items in the stack, the method continues to block 525 where metadata identifying the determined creation order of the content items is added to the content items.

At block the 530 the content items in the stack are removed. The method then continues to block 535 where the method determines if there are any unprocessed content items remaining in the indexed list. If there are no remaining content items, the method ends. Alternatively, if there are remaining content items, the method returns to block 505.

If at block 515 it is determined that there is only one content item in the stack, the method continues to block 530 where the content item is removed from the stack. The method then continues to block 535 where the method determines if there are any unprocessed content items remaining in the indexed list. If there are no remaining content items, the method ends. Alternatively, if there are remaining content items, the method returns to block 505.

Figure 6:
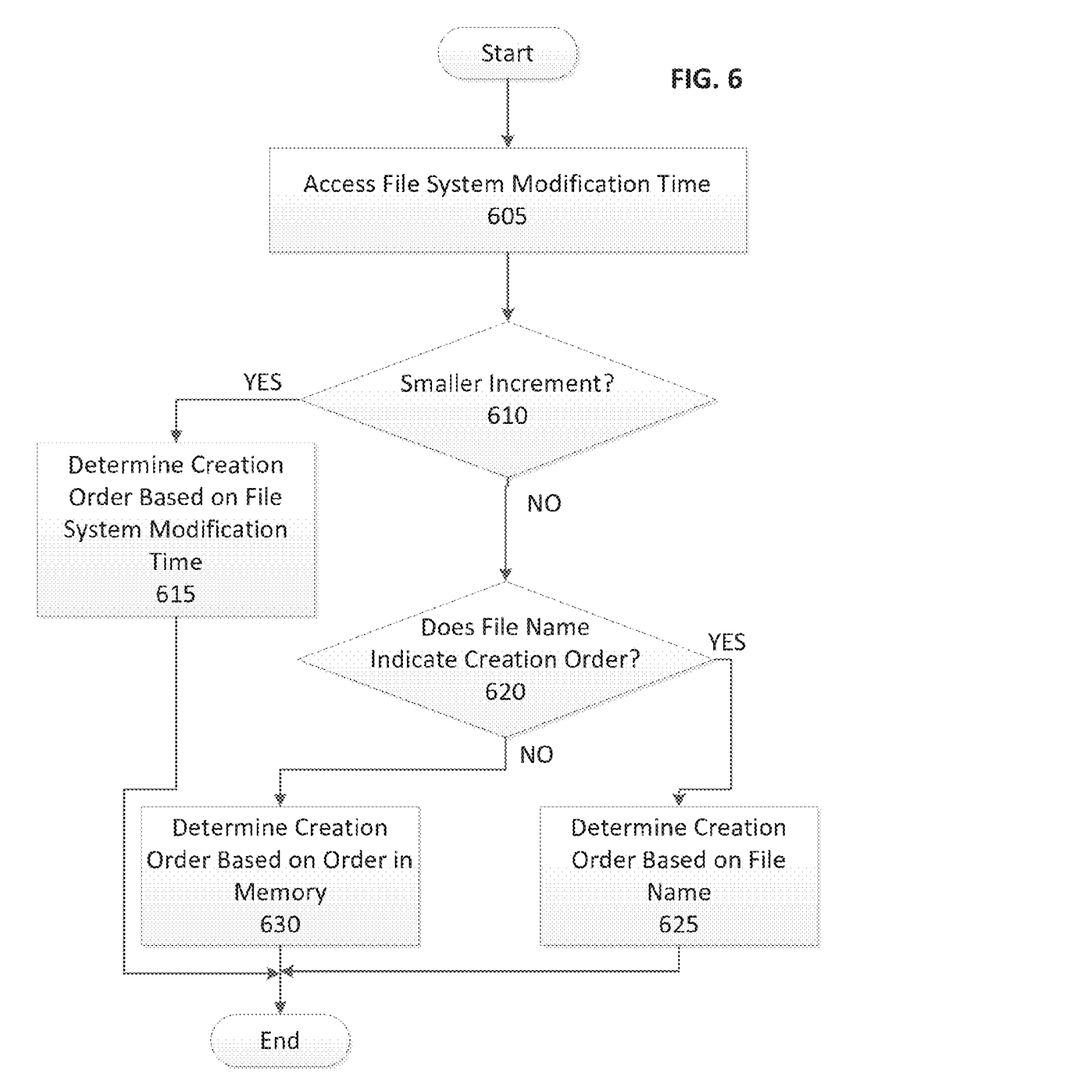
FIG. 6 shows one exemplary method embodiment of determining the creation order of multiple content items associated with the same metadata creation time.

FIG. 6 shows one exemplary method embodiment of determining the creation order of multiple content items associated with the same metadata creation time. Although specific steps are show in FIG. 6, in other embodiments a method can have more or less steps.

As shown, the method begins at block 605 where the file system modification time of each of the content items is accessed. The method then continues to block 610 where it is determined if the file system modification time measures time in a smaller increment than the metadata creation time measures time. If at block 610 it is determined that the files system modification time measures time in smaller increments than the metadata creation time, the method continues to block 615 where the creation order of the content items is determined based on the file system modification time associated with the content items. The method then ends.

If, however, at block 610 it is determined that the file system modification time is measured in the same or larger time increments than the metadata creation time is created in, the method continues to block 620 where it is determined if the file name associated with the content items includes data identifying the creation order. For example, the file names can include a number that is incremented for each content item created. If at block 620 it is determined that the file name associated with the content items does include data identifying the creation order, the method continues to block 625 where the creation order is determined based on the file name associated with the content items. The method then ends.

Alternatively, if at block 620 it is determined that the file name associated with the content items does not include data identifying the creation order; the method continues to block 630 where the creation order of the content items is determined based on the order of the content items in memory. For example, the content items can be stored in an indexed list. The creation order of the content items can be determined based on the order in which the content items are placed in the indexed list. The method then ends.

Figure 7A:
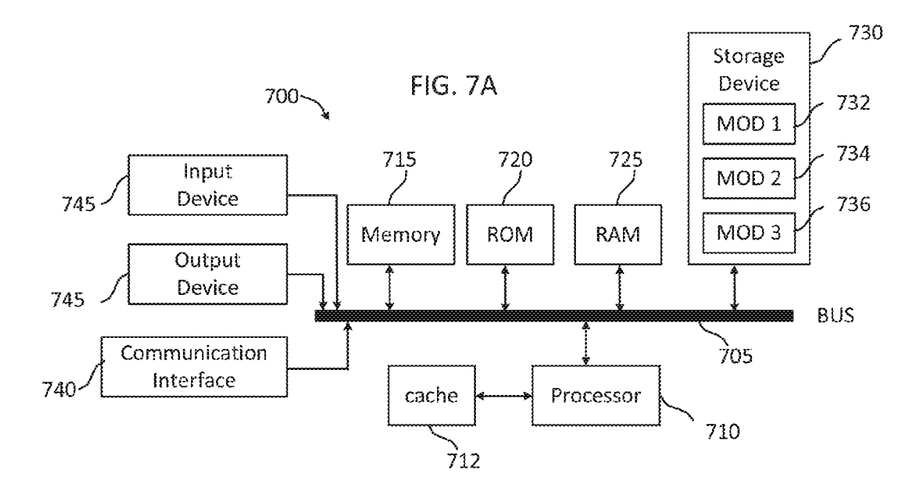
FIGS. 7A and 7B show exemplary possible system embodiments.
Figure 7B:
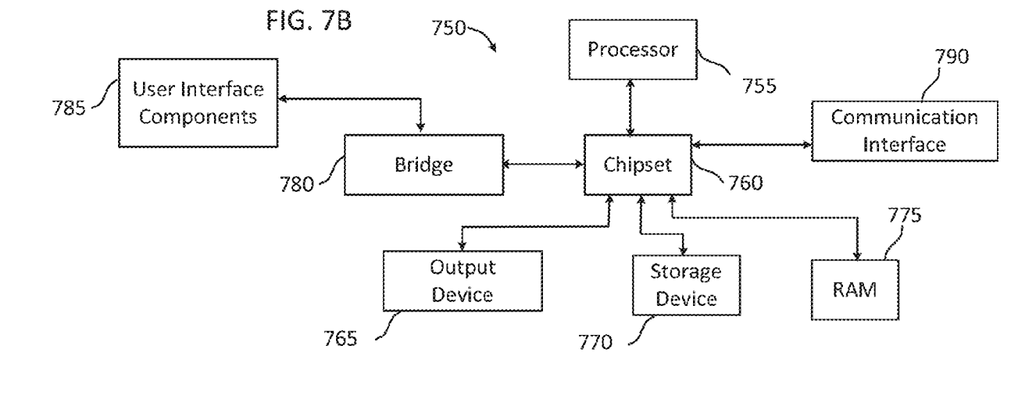

FIG. 7A, and FIG. 7B show exemplary possible system embodiments. The more appropriate embodiment will be apparent to those of ordinary skill in the art when practicing the present technology. Persons of ordinary skill in the art will also readily appreciate that other system embodiments are possible.

FIG. 7A shows a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions.

Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B shows a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer implemented method comprising:
   identifying at least a first content item associated with a first metadata creation time and a second content item associated with the same metadata creation time;
   comparing, via a processor, a first file system modification time associated with the first content item to a second file system modification time associated with the second content item;
   when the first file system modification time is earlier in time than the second file system modification time, determining that the first content item was created before the second content item; and
   transmitting the first content item and the second content item to a content management system over a network.

2. The method of claim 1, further comprising:
   analyzing a name associated with the first content item and a name associated with the second content item to determine a creation order;
   appending first metadata to the first content item indicating that the first content item was created before the second content item; and
   appending second metadata to the second content item indicating that the second content item was created after the first content item.

3. The method of claim 1, wherein the first metadata creation time is measured in seconds and the first file system modification time is measured in milliseconds.

4. The method of claim 1, further comprising:
   when the first file system modification time is equal to the second file system modification time, analyzing a first file name associated with the first content item and a second file name associated with the second content item; and
   upon a determination that the first file name and the second file name indicate an order in which the first content item and the second content item were created, determining a creation order of the first content item and the second content item based on the first file name and the second file name.

5. The method of claim 4, wherein the first file name includes a first number and the second file name includes a second number, and the determining a creation order includes:
   comparing the first number to the second number; and
   when the first number is less than the second number, determining that the first content item was created before the second content item.

6. The method of claim 1, further comprising:
   when the first file system modification time is equal to the second file system modification time, comparing a first index number identifying a position of the first content item in memory to a second index number identifying a position of the second content item in memory;
   when the first index number is less than the second index number, determining that the first content item was created before the second content item.

7. The method of claim 1, wherein the content management system is a synched content management system.

8. A client device, comprising:
a processor; and
a memory containing instructions that, when executed, cause the processor to:
identify at least a first content item associated with a first metadata creation time and a second content item associated with the same metadata creation time;
determine that the first content item was created before the second content items based on an analysis of at least one of the first content item or the second content item; and
transmitting the first content item and the second content item to a content management system over a network.

9. The client device of claim 8, where the determining comprises:
comparing a first file system modification time associated with the first content item to a second file system modification time associated with the second content item;
when the first file system modification time is earlier in time than the second file system modification time, determine that the first content item was created before the second content item.

10. The client device of claim 9, wherein the first metadata creation time is measured in seconds and the first file system modification time is measured in milliseconds.

11. The client device of claim 8, wherein the instructions further causer the processor to:
analyze a name associated with the first content item and a name associated with the second content item to determine a creation order;
append first metadata to the first content item indicating that the first content item was created before the second content item; and
append second metadata to the second content item indicating that the second content item was created after the first content item.

12. The client device of claim 8, wherein the determining comprises:
analyzing a first file name associated with the first content item and a second file name associated with the second content item, wherein the first file name includes a first number and the second file name includes a second number;
comparing the first number to the second number; and
when the first number is less than the second number, determining that the first content item was created before the second content item.

13. The client device of claim 8, wherein the determining comprises:
comparing a first index number identifying a position of the first content item in memory to a second index number identifying a position of the second content item in memory;
when the first index number is less than the second index number, determining that the first content item was created before the second content item.

14. The client device of claim 8, wherein the determining comprises:
identifying a first object depicted in the first content item at a first position;
identifying the first object depicted in the second content item at a second position;
determining a direction of motion of the first object from a starting position to an ending position; and
when a first distance measured from the first position to the starting position is shorter than a second distance measured from the second position to the starting position, determining that the first content item was created before the second content item.

15. The client device of claim 14, wherein determining the direction of motion of the first object is based on a third content item depicting the first object.

16. The client device of claim 15, wherein the third content item is associated with a second metadata creation time before the first metadata creation time and the third content item depicts the first object at a third position, wherein a third distance measured from the third position to the starting position is shorter than the first distance.

17. The client device of claim 8, wherein the content management system is a synched content management system.

18. A non-transitory computer-readable medium containing instructions that, when executed by a computing device, cause the computing device to:
identify at least a first content item associated with a first metadata creation time and a second content item associated with the same metadata creation time;
compare a first file system modification time associated with the first content item to a second file system modification time associated with the second content item;
when the first file system modification time is earlier in time than the second file system modification time, determine that the first content item was created before the second content item; and
transmit the first content item and the second content item to a content management system over a network.

19. The non-transitory computer-readable medium of claim 18, wherein the determining comprises:
identifying a first object depicted in the first content item at a first position; identifying the first object depicted in the second content item at a second position;
determining a direction of motion of the first object from a starting position to an ending position; and
when a first distance measured from the first position to the starting position is shorter than a second distance measured from the second position to the starting position, determining that the first content item was created before the second content item.

20. The non-transitory computer-readable medium of claim 18, wherein the content management system is a synched content management system.

* * * * *